Feb. 21, 1933.  P. O. NOBLE  1,898,060
METHOD AND APPARATUS FOR ELECTRIC ARC WELDING
Original Filed Sept. 11, 1919  4 Sheets-Sheet 1

Inventor:
Paul O. Noble,
by Allen G. Davis
His Attorney.

Feb. 21, 1933.                    P. O. NOBLE                    1,898,060
                METHOD AND APPARATUS FOR ELECTRIC ARC WELDING
                    Original Filed Sept. 11, 1919    4 Sheets-Sheet 2

Inventor:
Paul O. Noble,
by *Alvin G. Davis*
His Attorney

Feb. 21, 1933.　　　　P. O. NOBLE　　　　1,898,060
METHOD AND APPARATUS FOR ELECTRIC ARC WELDING
Original Filed Sept. 11, 1919　　4 Sheets-Sheet 4

Fig.7

Inventor:
Paul O. Noble,
by Albert G. Davis
His Attorney.

Patented Feb. 21, 1933

1,898,060

UNITED STATES PATENT OFFICE

PAUL O. NOBLE, OF SCHENECTADY, NEW YORK, ASSIGNOR TO GENERAL ELECTRIC COMPANY, A CORPORATION OF NEW YORK

METHOD AND APPARATUS FOR ELECTRIC ARC WELDING

Application filed September 11, 1919, Serial No. 323,170. Renewed July 15, 1932.

My invention relates to electric arc welding and one of its objects is to provide improved automatic apparatus for continuously feeding a welding electrode to the welding arc and regulating the rate of feed of the electrode automatically to maintain, with accuracy and reliability, a welding arc of any desired predetermined length, whereby electric arc welding may be more perfectly carried out and the range of work greatly increased, and whereby welds may be made with greater regularity, and mechanical strength than in the case of hand welding and at the same time made at higher speed and with more economical use of welding material. It is my object to provide a machine with which electrodes may be successfully used which range from a size much smaller than can be used by hand or by any automatic machine heretofore produced with which I am familiar, to a size that is considerably larger than has heretofore been used, while the arc length is in all cases regulated with such precision that a very short arc may be maintained when desired.

A further object of my invention is to provide apparatus and methods of operation whereby rods or shafts may be enlarged, or metal built up thereon in the form of flanges or collars, in a way to prevent warping, whereby a great saving may be effected in the cost of original production of such articles as well as in repairing and reconstructing articles worn out or ruined in the course of machining.

A further object is to provide a novel method of starting the welding arc and also to provide a form of electrode adapted for such method of starting.

My invention further comprises a novel means for transmitting current to a moving electrode, and other combinations and details, which will appear in connection with the following description and which are set forth in the appended claims.

My invention enables the arc length to be maintained with a high degree of constancy notwithstanding irregularities and inequalities in the surface of the work and is adapted for a wide range of work varying from heavy articles to the welding of sheets of a thinness far below that with which manual arc welding is possible.

In accordance with my invention, I provide an arc welding device whereby a welding electrode is fed continuously to the welding arc, the rate of feed being regulated to maintain the arc at substantially constant length. The electrode preferably is fed by an electric motor, the speed of which is varied in accordance with an electrical characteristic of the welding current for example in accordance with the variations of the voltage across the terminals of the welding arc.

This application is a continuation in part of my application Serial No. 254,710, filed Sept. 19, 1918, all of the disclosure in said application being embodied in this application together with additional matter.

In the accompanying drawings.

Figure 1:
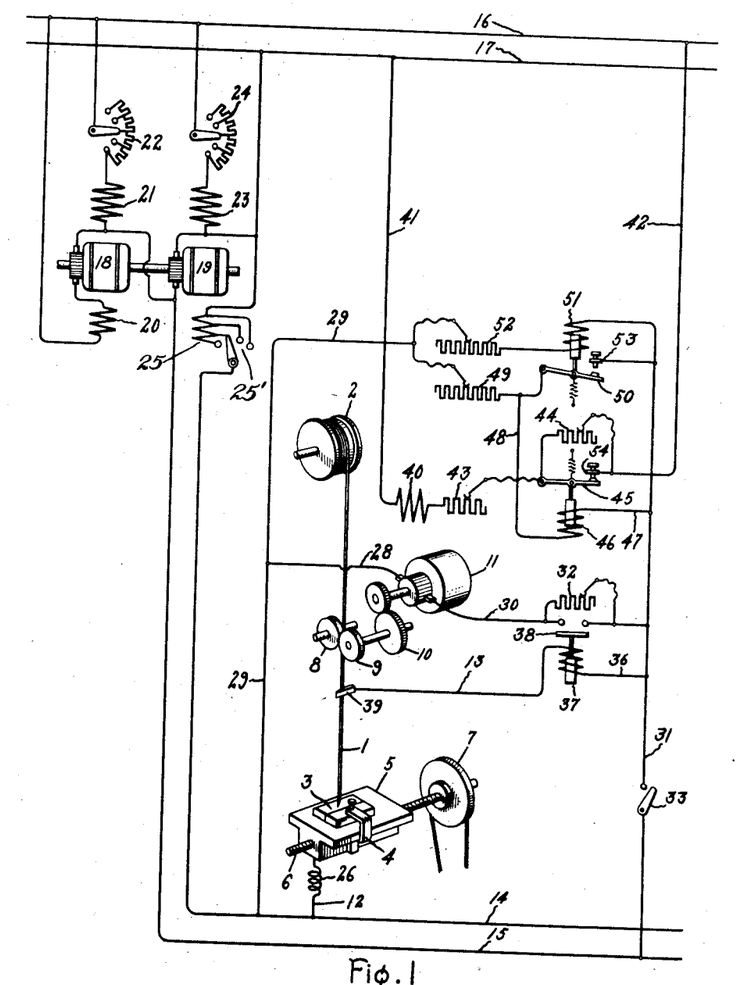
Fig. 1 illustrates diagrammatically an embodiment of my invention particularly adapted for feeding a consuming electrode such as a metal rod or wire to an arc playing between the wire and the work.

Referring to Fig. 1 of the drawings, the welding electrode 1, shown in this case as a flexible wire of iron or steel, is fed from a reel 2 to a welding arc playing between the wire 1 and the work 3, which may consist for example of two plates to be welded together along their edges by melted metal derived from the welding electrode 1. The work is suitably held for example by means of one or more clamps 4 (one only having been shown) upon a table 5. The table 5 is traversed in the direction of the seam to be welded in any suitable manner, for example, by the rotation of a threaded shaft 6 driven by pulley and belt 7 or in any other suitable manner. The electrode 1 is uncoiled and moved forward as it melts at a rate adapted to maintain the welding arc at substantially constant length. The means indicated for moving the wire constituting the welding electrode comprises two guiding and feeding wheels or rollers 8 and 9 driven through a suitable speed reducing gear 10 by an electric motor 11. Where large electrodes are used, for example those approximating ½″ in diameter, the flexibility is so slight that the reel 2 is not used. In such cases the electrode is in the form of a straight rod which is guided in any suitable manner to feed rollers 8 and 9.

The work 3 and the welding electrode 1 are connected respectively by conductors 12 and 13, to current mains 14 and 15 carrying preferably direct current having a suitable characteristic for welding. The welding current in the arrangement shown is derived from constant potential mains 16 and 17 carrying current at commercial voltage, for example, about 125 volts. Between the constant potential mains 16 and 17 and the welding current mains 14 and 15 is connected some suitable device for modifying the amperage and voltage of the welding current in a suitable manner to give the electrical characteristics desired for arc welding. Various regulators may be employed for this purpose but the preferred means, as illustrated in this figure, comprises a motor generator or balancer set comprising a motor 18 and a generator 19 having their armatures connected in series and deriving power from the constant potential mains 16 and 17. The balancer set shown in Fig. 1 is described and claimed in my Patent No. 1,310,131 granted July 15, 1919. The electrical current derived from mains 16, 17 is modified by the balancer so that the amperage and voltage of the welding current in the mains 14 and 15 vary inversely with respect to each other and maintain substantially constant energy in the welding arc between the electrodes 1 and 3.

The motor 18 has a field winding 20 connected in series with the armature and a field winding 21 connected cumulatively in shunt to the armature and in series with an adjustable regulating resistance 22. The generator 19 has a separately excited field winding 23 connected across the mains 16 and 17 in series with an adjustable regulating resistance 24 and an opposing field winding 25 connected in series with the welding arc. The differential series field winding 25 is provided with a number of taps brought out to any convenient means 25′ for adjusting the number of turns in circuit. In order to smooth out fluctuations in the welding current, a small amount of reactance 26 may be provided in series with the welding arc.

The armature of the motor 11 is connected by the conductors 28, 29 to the welding main 14 and by conductors 30, 31 in series with an adjustable resistance 32 to the welding main 15. Connected in series with the welding arc by conductors 13, 36 is a relay 37, the armature of which is picked up immediately after the arc is started, short-circuiting the resistance 32 by means of a contact 38. The motor armature thereafter is connected directly across the welding mains. The brush 39 represents contact means for leading current from the conductor 13 to electrode 1. The resistance 32 is provided as a protective means for the armature of the motor which is designed to operate with an impressed voltage of about 12 to 18 volts. The action of the protective means is hereinafter fully set forth in connection with the description of the operation of the modification shown in Fig. 1. At this point, it may be stated, however, that before the arc is struck, the voltage of the welding circuit 14, 15, is preferably approximately 60 volts.

Figure 2:
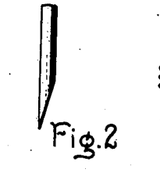
Figs. 2 and 3 show the end of the electrode arranged to permit ready starting of the arc.
Figure 3:
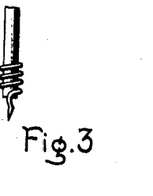

In order to enable an arc to be readily struck without the necessity of backing away the welding electrode from the work, the end of the electrode is preferably provided with a tip which is readily volatilized by the welding current. As illustrated in Fig. 2, the electrode may be sharpened at the beginning of the welding operation by means of cutting pliers or in any other convenient way. As the attenuated point of the welding electrode comes into contact with the work and receives a rush of current, the point is burned away thus starting the welding arc. An alternative arrangement for providing the readily volatilizable tip for the electrode is shown in Fig. 3. In this form which is especially adapted for electrodes of large size, which would be somewhat difficult to sharpen with a file or cutting pliers, a small coil of electrode material having a projecting end to engage the work is arranged to be slipped over the end of the welding electrode. A number of these removable tips are provided in a convenient place so that the operator may apply one to the electrode whenever it becomes necessary to start the arc. Obviously my invention is not limited to the particular forms of vaporizable tip disclosed, since other forms may be used without departing from the spirit of my invention.

The field 40 of the motor 11 is connected by conductors 41 and 42 in series with adjustable resistances 43 and 44 across the constant potential mains 16 and 17. The resistance 43 is a regulating resistance which, when properly adjusted, remains in circuit with the motor field.

The effective value of the resistance 44 is adapted to be varied by the vibrations of a switch 45, controlled by the regulating magnet 46. Magnet 46 is connected respectively by the conductors 47, 31 and the conductors 48, 29 to the welding circuit 14, 15 in series with an adjustable resistance 49. In order to protect the magnet 46 and to insure that the resistance 44 is short circuited when abnormally high voltage obtains in the welding circuit, it is arranged to be short-circuited by a switch 50 controlled by a magnet 51. The magnet 51 is connected in series with an adjustable resistance 52 by conductors 29, 31 to the welding circuit 14, 15, so that as soon as the switch 33 is closed, the magnet 51 becomes energized, closing the switch 50 thus removing the coil 46 from circuit during the time that the voltage is sufficiently high to maintain the switch 50 closed.

The operation of the invention shown in Fig. 1 is substantially as follows:

The electrode 1 having been provided with a readily vaporizable tip, switch 33 is closed for completing the circuit of the armature of the motor 11 through resistor 32 and the motor begins to revolve and slowly feed the electrode 1 towards the work. As soon as the tip of the electrode engages the work, the welding circuit is completed and the tip of the electrode at once vaporizes and the arc is struck. The welding current will at once energize a relay 37 to close switch 38 and short-circuit the resistance 32. The motor armature 11 is thus connected directly across the welding circuit 14, 15.

When the arc has been struck, the balancer set 18, 19 acts to reduce the voltage of the welding circuit from, for example, 60 volts to about 12 volts, although a higher arc voltage may be used when desired, and the magnet 51 which has a relatively high resistance becomes weakened so as to release the switch 50 from engagement with cooperating contact 53, thereby opening the short-circuit about the terminals of the field controlling magnet 46. The magnet 46 is designed to draw the switch 45 out of engagement with the stationary contact 54 when the voltage of the welding arc increases beyond a predetermined value and to permit the switch 45 to engage with the contact 54 when the voltage of the welding arc falls below this predetermined value. As the voltage of the motor generator or balancer set 18, 19 varies the voltage and amperage of the welding current in accordance with variations of length in the welding arc in such a manner that the energy consumption of the arc will be substantially constant, any variations in the length of the welding arc are accompanied by variations in voltage and current in the welding circuit 14, 15. The effect of the variations, even though very slight, is to maintain the magnet 46 in continual vibration, although the vibrations may be so slight as to be scarcely noticeable. The relative duration between the periods of make and break of the contacts 45 and 54 which shunt the resistance 44 will determine the strength of the current in the field winding 40, and thereby determine the speed of the motor. For example, if the speed of the motor tends to become too long, the welding arc tends to become too long, the incipient rise in the voltage in the welding circuit 14, 15 varies the operation of the regulating magnet 46 to increase the effective value of the resistance 44, thereby weakening the field excitation of the motor 11. This causes the motor 11 to speed up slightly and thus re-establish the desired length of welding arc before the variation from the predetermined length has become noticeable. Conversely, an incipient shortening of the arc and a minute fall of voltage causes the effective value of resistance 44 to be reduced, thereby varying the field strength of the motor to decrease the rate at which the electrode is fed to restore the arc length to its predetermined desired value. The sensitiveness of the regulation is increased by connecting the armature of motor 11 across the welding circuit, since a rise in arc voltage corresponding to an increase in arc length tends to increase the rate of electrode feed, while a fall in arc voltage corresponding to a decrease in arc length tends to decrease the rate of electrode feed.

Where, as in this case, the feed motor is connected across the welding circuit, it must be designed to operate at the low voltage which obtains when the arc is established and this voltage, as above set forth, may be approximately 12 volts. When the welding current ceases to flow, however, the voltage of the welding circuit rises to several times this value and may be, for example, 60 volts as above set forth. The resistance 32 is therefore arranged to be in circuit whenever the flow of welding current ceases, since otherwise an excessive voltage would be applied to the motor armature and this high voltage would tend to cause the motor to feed the electrode forward at too high a rate to permit the arc to be started, notwithstanding the fact that while excessive voltage obtains in the welding circuit, 14, 15, the relay 51 short-circuits magnet 46 to cause the resistance 44 to be short-circuited and a strong field applied to the motor. The relay 37 is therefore provided for causing the resistance 32 to be placed in circuit with the motor armature whenever the welding current ceases to flow, and for causing the resistance to be rendered inoperative upon the resumption of the flow of welding current. Similarly, the relay 51 acts not only to protect the magnet 46 from high voltage, but also affects the operation of magnet 46 to cause the motor field to be increased to its maximum value whenever the welding current ceases to flow, since in such cases, the voltage of the welding circuit will rise to the predetermined value necessary to operate the relay 51.

Figures 4, 8, 9, 10:
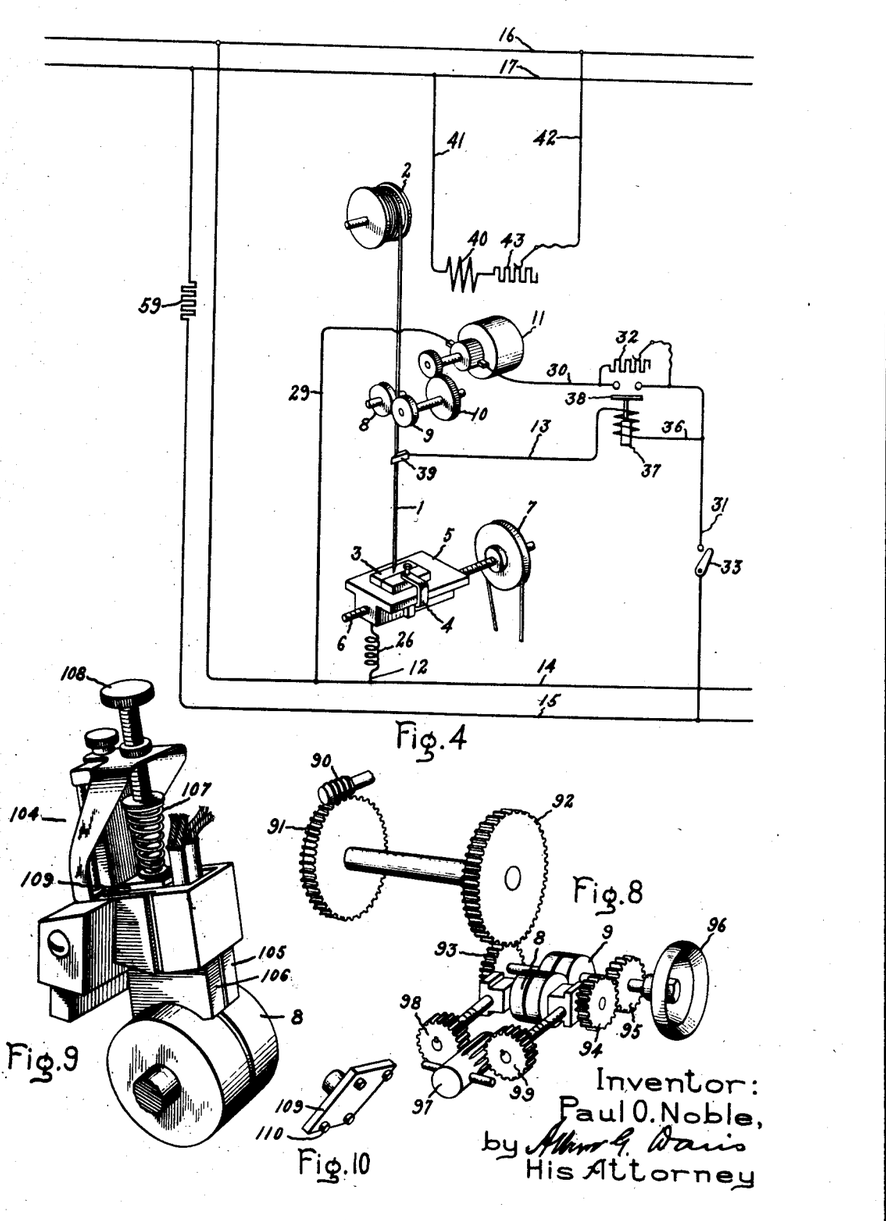
Fig. 4 shows a modified arrangement of circuit connections for controlling the arc length.
Fig. 8 shows in detail a part of the mechanism of Fig. 7.
Fig. 9 shows in detail the means used in Fig. 7 for conducting current to the moving electrode.
Fig. 10 is a detail view showing the pressure equalizing plate for the brushes of Fig. 9.

When it is desired to vary the welding current for any given electrode, or adjust the current for different sizes of electrodes, the generator or regulating means controlling the energy supplied to the welding circuit, is adjusted to vary the slope of the welding circuit characteristic thereby changing the voltage corresponding to any given current. In the arrangement shown in Fig. 1 this adjustment is secured by varying the number of turns in the differential series winding 25 by the means 25'. Whether a balancer set of the type shown in Fig. 1, or a regulating resistance as shown in Fig. 4 be used, the current on short circuit may be adjusted without changing the open circuit voltage. If an adjustment is made for greater current on short circuit the current at any given voltage is therefore greater. The welding energy which is maintained substantially constant may be thus adjusted to any desired value. I have found that the rate of electrode consumption is dependent solely upon the current in the welding circuit and independent of the voltage across the arc, therefore, an adjustment for greater current in the welding circuit which causes the electrode to be consumed at a greater rate does not require, and ordinarily should not be accompanied by any increase in the arc voltage. In my arrangement the arc voltage is automatically maintained constant as heretofore set forth, and the rate at which the electrode is fed to the work is varied to compensate for any change in the rate of electrode consumption, whether due to intentional adjustment of the welding current or to other causes. Where a considerable change in the rate of electrode feed is desired, the required variation in the field current of the electrode feed motor may be so great as to make it necessary to adjust the resistance 44 or the resistance 43 or both as is well known in the art of electric regulation with vibratory regulators. If at any time it is desired to adjust the constant arc voltage for which the vibrating regulator is set this may be done by adjusting the resistance 49.

While I prefer to connect the motor armature 11 across the welding circuit making the resistance of the armature circuit so low as to cause the motor speed to vary in response to small changes in normal arc voltage to increase the sensitiveness of the operation, my invention is, however, not limited to such connection of the motor armature, since the regulation for the motor field is sufficiently sensitive to give good results when the motor armature is connected, for example, to a constant potential source.

While I have shown and described the regulation as responsive to variations in the voltage across the welding circuit, and while this arrangement is preferred for the reason that it provides a more sensitive and precise regulation of the arc length, my invention in its broad aspect is not limited to such regulation, since it is possible where the current and voltage vary substantially inversely, to secure a somewhat less sensitive regulation in response to variations in the current in the welding circuit. I have, therefore, broadly defined the regulation in certain of the appended claims as responsive to an electrical characteristic of the welding current or energy, or as responsive to a factor of the energy of the arc.

In the embodiment of my invention, disclosed in Fig. 4, the automatic regulation of the field circuit of the motor 11 is omitted and the field winding 40 connected directly to the constant potential mains 16, 17, through the adjustable resistance 43. The field winding 40 is therefore constantly energized in this modification and the entire regulation of the rate of feeding of the electrode is taken care of by the inherent tendency of the motor armature to vary in speed with variations in voltage across its terminals which are connected directly across the welding circuit 14, 15, as in Fig. 1. In the modification shown in Fig. 4, the device for modifying the amperage and voltage of the welding current to give the electrical characteristics desired for arc welding is represented as a resistor 59. This resistor operates in a well-known manner to reduce the voltage of the welding circuit upon increase of welding current. The arrangement shown in Fig. 4 for automatically controlling the rate of feeding of the electrode by the inherent speed regulation of the motor is shown in my co-pending application, Serial No. 323,171, filed September 11, 1919, for "electric welding apparatus" which has resulted in Patent No. 1,731,934, granted October 15, 1929.

Figures 5, 6:
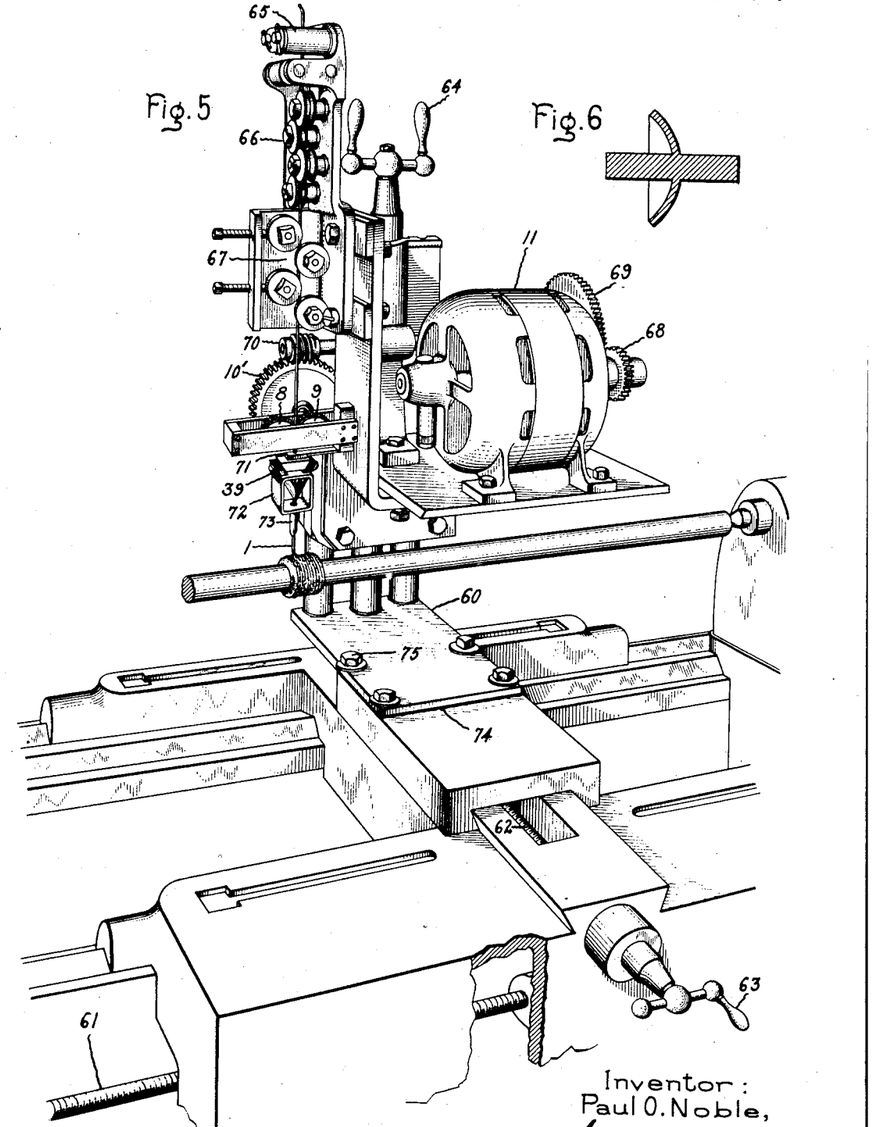
Fig. 5 represents a practical embodiment of the invention, the work being shown as arranged for building up a collar on a rotatable shaft.
Fig. 6 shows in section, a curved flange which the apparatus is adapted to produce.

Fig. 5 represents in perspective a welding apparatus representing a practical embodiment of the apparatus diagrammatically represented in Figs. 1 and 4. In this figure the welding head is represented as carried upon the tool post holder 60 of an ordinary lathe, having the usual guide rails and lead screw 61. The welding head is adapted to be traversed longitudinally by means of the lead screw 61 and transversely by means of the screw threaded shaft 62, to which the handle 63 is connected. The welding head is adapted to be adjusted vertically by means of the handle 64 which operates a screw threaded shaft arranged to operate for vertical adjustment in the same manner that shaft 62 operates for horizontal adjustment. The welding head comprises the feed rollers 8 and 9, guide rollers 65 and wire straightening rolls 66 and 67 for the movable electrode. Power is transmitted to the feed rollers 8 and 9 from the motor 11 through the gears 68 and 69, the gear 69 being mounted on a shaft carrying the worm 70 which drives the worm wheel 10' mounted on the shaft of the feed roller 9. Gears are provided on the shafts of the rollers 8 and 9 to insure that they rotate at the same speed in opposite directions. Current is led into the moving electrode by means of brush 39 which is in this case represented as a V type brush, mounted on the support 71, the two members of the V type brush being surrounded by a box like structure 72 which carries a guide 73 for the electrode. The welding head is insulated from the lathe bed and work by the plate of insulation 74 and the usual insulating bushings around the bolts 75.

The work shown in Fig. 5 is represented as a rotatable shaft upon which a collar is being built up which may be subsequently machined to the desired size. In building up such a collar the welding head is adjusted to the proper position, the work set into rotation by an ordinary lathe chuck and the welding arc struck between the work and the electrode. As the shaft rotates, a thread of metal is welded to the shaft and, if the welding head is moved longitudinally of the work at the proper rate, the thread of deposited metal will form a continuous layer of metal upon the work. When this layer has reached the desired length, motion of the welding head is reversed to weld another layer of metal upon the first and this process may be continued until the shaft has been enlarged, or a collar or flange formed thereon, to the desired diameter. The longitudinal movement of the welding head may be produced by the lead screw 61, and if desired, automatic means may be provided for securing an automatic reversal of the direction of feed at each end of the travel so that the action of the machine in forming the enlargement on the shaft is entirely automatic. If no longitudinal motion is given to the welding head the metal will be built out in the form of a thin radial flange. By giving a very small longitudinal movement to the welding head, a flange of the form shown in Fig. 6 may be produced. Where such longitudinal movement is large relative to the speed of rotation a spiral enlargement may be built up on the shaft. While it is possible, by manual, electric arc, or acetylene welding to enlarge a shaft by traversing the welding arc to deposit a strip of metal longitudinally of the shaft while the shaft is held stationary, and then turning the shaft slightly and traversing the arc to deposit another longitudinal strip of metal alongside the first, and continuing this process until a continuous layer of metal has been deposited on the shaft; such operation almost invariably either causes immediate warping of the shaft or introduces such strains that the shaft warps during the process of machining. Where an enlargement is produced in accordance with my invention, this objectionable tendency of the shaft to warp is not present. By my method of operation it is possible to repair articles that have been worn down to too small a diameter by enlarging them and subsequently machining them down to the proper size. Furthermore, where it has heretofore been customary to machine down a shaft throughout almost its entire length to provide a small collar thereon, by my invention it becomes possible to save material by building out a small collar wherever it is desired on the shaft.

Figure 7:
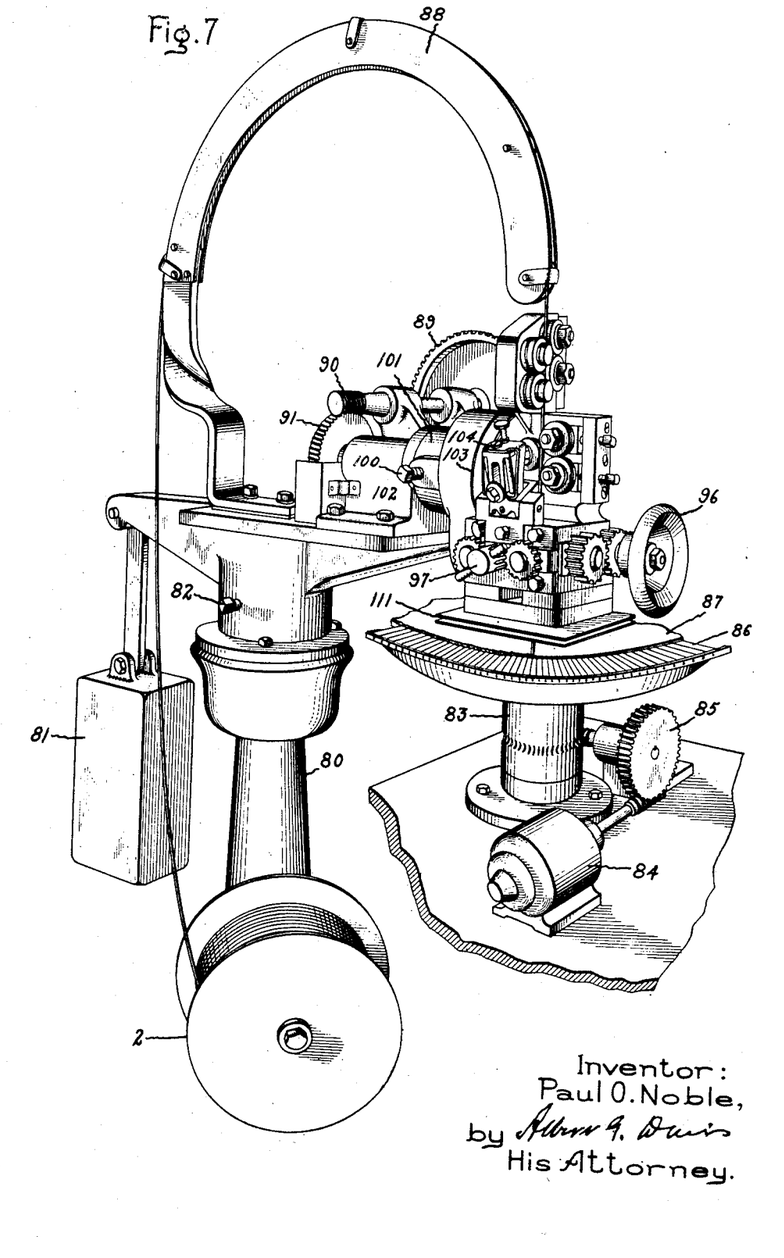
Fig. 7 shows another embodiment of the welding apparatus with the work arranged for rotation in a horizontal plane.

Fig. 7 represents another embodiment of my invention in which a welding head of a somewhat different form is mounted upon a pedestal 80, the weight of the welding head being counterbalanced by a weight 81 so that by loosening the set-screw 82 the welding head may be adjusted in a horizontal plane to any desired position. Means not appearing in the drawing are provided for adjusting in the head along the base to vary the distance of the head from the pedestal. The work in this figure is represented as mounted for rotation in a horizontal plane upon a support 83 arranged to be rotated by motor 84 through speed reducing gearing 85. The work is shown as a turbine-wheel, the buckets 86 of which are being welded to the supporting disk or ring 87. The welding electrode is represented as being fed from the reel 2, through the guide 88 to the straightening rolls of the welding head. The welding head comprises the feed rollers 8 and 9 shown in detail in Fig. 8. Power is transmitted to the feed rollers from a motor which does not show in Fig. 7 to the gear 89 which drives the worm 90 which in turn drives the worm wheel 91 upon the shaft of which is mounted the spur gear 92 which meshes with the gear 93 mounted on the shaft of the feed roller 9. The gears 94 and 95 mounted respectively on the shafts of the feed rollers 8 and 9 insure that these rollers rotate at the same speed in opposite directions. A hand wheel 96 is provided on the shaft of feed roller 9 to enable the starting of the feeding operation to be assisted by hand when for any reason the feed motor fails to start the feeding operation when the switch 33 of Fig. 1 is closed. The feed rollers may be adjusted to accommodate different sizes of electrodes and to vary the pressure upon any given electrode by means of the member 97 which may be adjusted by hand to turn the gears 98 and 99 which operate simultaneously to adjust the position of the bearings in which the roller 8 is mounted.

It is frequently necessary or desirable to adjust the angular relation of the electrode to the work and the machine shown in Fig. 7 may be adjusted to vary this angular relation by loosening the set screw 100 and rotating the welding head to the desired position, the entire head being supported by the tubular member 101 through which the set screw passes. The member 101 is supported upon a cylindrical projection upon the member 102. The shaft upon which the gears 91 and 92 are secured passes through the cylindrical projection upon which the member 101 is supported. The welding head in this case is insulated from its support by means of the insulating plate 103 and by making one of the gears 92 or 93 of non-conducting material. The welding head is thus seen to be supported for rotatable adjustment about the axis of the gear 92.

The welding head shown in Fig. 7 embodies a novel arrangement of the parts for leading current to the moving electrode. This arrangement comprises a brush 104, shown in detail in Fig. 9, which directly engages the feed roller 8 which is in firm contact with the moving electrode. The feed rollers 8 and 9 are preferably made of bronze, The brush 104 comprises a pair of independently movable carbon or composition blocks or brushes 105 and 106. These members are pressed into engagement with the surface of the roller 8 by means of spring 107, the compression of which may be adjusted by the thumb screw 108. The plate 109 is provided with projections 110 which engage the carbon brushes and equalize the pressure thereupon. By leading the current directly to one of the feed rollers for the electrode the length of the welding head may be materially shortened, and heavy currents readily handled for the reason that the contact pressure of the feed rollers upon the electrode is comparatively great and heavy current may be transmitted to the electrode, although the contact surface of the electrode is small.

The welding head shown in Fig. 7 is provided with a heat radiating means 111 which may consist of one or more plates preferably mounted on the welding head between the welding head and the work. The welding electrode projects through this radiating means. By means of this construction the welding head may be brought close to the work and the length of the electrode carrying current reduced to the minimum without objectionable heating of the welding head.

The arrangement shown in Fig. 7 is adapted to be operated to build up a flange upon or increase the thickness of a horizontally rotatable article.

It will be obvious to those skilled in the art that the form of welding head shown in Fig. 7 may if desired be mounted as the welding head shown in Fig. 5 is mounted and that likewise, the welding head shown in Fig. 5 may, if desired be mounted on a stationary support as the welding head shown in Fig. 7 is mounted. It is furthermore obvious that where relative transverse movement is to be produced between the electrode and the work it is possible to arrange either the work or the welding head to be moved. If, for example, it were desired to make a weld of the nature shown in Figs. 1 and 4 with the welding head shown in Fig. 5, it is clear that the welding head might be mounted alongside the lathe bed, the work being moved under the welding head by means of the lead screw of the lathe. It is also obvious that the contact brush arrangement of Figs. 7 and 9, may be used with the welding head shown in Fig. 5 if desired.

While I have shown and described certain particular embodiments of my invention such modifications and variations are contemplated as fall within the scope of my invention which is set forth in the appended claims.

What I claim as new and desire to secure by Letters Patent of the United States, is:—

1. An arc welding device comprising an arc welding circuit for containing an electrode adapted to maintain a welding arc, a feed device for said electrode, an electric motor driving said device, a resistance in the field circuit of said motor, a vibratory electromagnetic switch for making and breaking a circuit shunting said resistance and circuit connections between said switch and the terminals of the welding arc whereby said switch is responsive to voltage variations of the arc.

2. An arc welding device wherein a fusible electrode is adapted to be continuously fed to the arc, a vibratory regulator connected to be responsive to the electrical condition of the arc, said vibratory regulator including a resistance and contacts for rapidly making and breaking a circuit shunting the resistance and means controlled by said vibratory regulator for controlling the length of the arc.

3. An arc welding device comprising a welding circuit for containing the work and a fusible welding electrode, a device for feeding said electrode toward the work, an electric motor therefor, circuit connections for the armature of said motor across the terminals of the welding arc, a source of constant potential current, connections between a field winding of said motor and said constant potential source, a resistance in circuit with said field winding, a contact for making and breaking a short-circuit about said resistance and means for timing the intervals of making and breaking in accordance with the voltage across the welding arc to vary the speed of said motor and thereby maintain the feed of the welding electrode substantially equal to the consumption thereof.

4. The method of operating a metallic arc welding apparatus comprising means for feeding a welding electrode, which consists in providing the electrode with an arc striking portion more readily volatilizable than the body of the electrode, feeding the electrode into contact with the work at a rate sufficiently low to permit the arc striking portion to volatilize and establish an arc, and then feeding the electrode at such a rate that the arc is maintained at substantially constant length.

5. An arc striking tip for arc welding electrodes comprising a volatilizable arc striking portion and a portion constructed to engage a welding electrode and secure the tip thereto.

6. An automatic arc welding device comprising means for supporting work to be welded, a device for feeding an electrode in arcing relation to the work, an arc welding circuit connected to said work and electrode, an electric motor adapted to operate with an impressed voltage of about 12 to 18 volts electrically connected to said welding circuit and driving said feed device, a resistance in series with the armature of said motor, means operative upon flow of current between said electrode and work to short-circuit said series resistance, and means for varying the field excitation of said motor to vary the speed of said motor to maintain a welding arc between said electrode and work at substantially predetermined potential.

7. The combination of a welding circuit, a fusible welding electrode, a motor connected to said circuit and arranged to feed said electrode at a rate depending upon the voltage at the arc, a protective means adapted to be connected in circuit with the motor to prevent excessive speed thereof due to abnormal voltage in the welding circuit and means to render said protective means inoperative when the welding current flows.

8. The combination of a welding circuit wherein the arc is maintained from electrode feeding means, a motor connected to said circuit and arranged to operate said feeding means at a rate varying with the voltage at the arc and means adapted to reduce the rate at which the electrode is fed upon a predetermined rise in voltage in the welding circuit.

9. The combination of a welding circuit, electrode feeding means, a motor connected to said circuit and arranged to operate said feeding means at a rate varying with the voltage at the arc and means adapted to increase the resistance of the motor armature circuit and increase the field strength of the motor when the welding current ceases to flow.

10. An automatic arc welding system comprising substantially constant voltage mains and mains adapted to deliver substantially constant energy, a welding circuit connected to be supplied from said substantially constant energy mains, means whereby the energy may be adjusted to any one of a plurality of values, feeding mechanism adapted to feed a fusible electrode to maintain the welding arc, an electric motor arranged to drive said feeding mechanism, said motor having a field winding supplied from said constant voltage mains, and an armature winding connected across said welding arc, the resistance of the armature circuit being so low as to cause the motor speed to be sensitive to changes in arc voltage.

11. An automatic arc welding system comprising substantially constant voltage mains and mains adapted to deliver substantially constant energy, a welding circuit connected to be supplied from said substantially constant energy mains, means whereby the energy may be adjusted to any one of a plurality of values, feeding mechanism adapted to feed a fusible electrode to maintain the welding arc, an electric motor arranged to drive said feeding mechanism, said motor having an armature winding connected across said welding arc, the resistance of said armature circuit being so low as to cause the motor speed to be sensitive to changes in arc voltage, and said motor having a field winding connected to be supplied from said constant voltage mains, and a vibratory regulator connected to control the excitation of said field winding in accordance with the voltage across the welding arc.

12. An automatic arc welding device comprising a welding head, electrode feeding means mounted in said head, a support for said welding head, a motor mounted on said support arranged to drive said feeding means, and means whereby the welding head may be adjusted with relation to said support, while maintaining the driving relation between said motor and feeding means, to vary the angle at which the electrode is delivered by said feeding mechanism.

13. In an electric arc welding machine, a welding head comprising feed rollers for feeding a welding electrode through the welding head, a gear for driving one of said feed rollers, a gear for transmitting power to said feed roller driving gear, and means for supporting the welding head for rotatable adjustment in the axial line of said power transmitting gear whereby the position of the head may be adjusted to vary the angular relation of the electrode to the work.

14. An automatic arc welding machine of the type employing a metallic electrode, comprising a support, a welding head projecting laterally from said support so as to furnish a free path alongside of the support for the work to be welded, an electric motor mounted on said support, electrode feeding mechanism mounted on the welding head, means whereby the welding head may be adjusted to change the angular relation of the electrode to the work, and means arranged to transmit power from said motor to said feeding mechanism in the axial line about which said welding head is adjustable.

15. An electric arc welding apparatus comprising an electric circuit adapted to include the welding electrodes, an electromagnetic feeding device for one of the electrodes in shunt with the arc, a resistance in the shunt circuit, and means for automatically cutting out the resistance when the arc is struck.

16. An electric arc welding apparatus comprising an electric circuit adapted to include the welding electrodes, an electromagnetic feeding device for one of the electrodes in shunt with the arc, a resistance in the shunt circuit, a solenoid in series with the arc, and a switch under the control of said solenoid and operative to cut out the resistance when the arc is struck.

17. In an automatic welding machine for a movable electrode, a head for carrying said electrode, means in said head for engaging said electrode and causing it to move, a tubular extension for said head, a rotatable shaft extending through said tubular extension and cooperable with said electrode engaging means, a support for said tubular extension, means whereby said tubular extension may be adjusted concentrically about said shaft relatively to said support, a means on said support for driving said shaft.

In witness whereof I have hereunto set my hand this 10th day of September, 1919.

PAUL O. NOBLE.

CERTIFICATE OF CORRECTION.

Patent No. 1,898,060.            February 21, 1933.

PAUL O. NOBLE.

It is hereby certified that error appears in the printed specification of the above numbered patent requiring correction as follows: page 7, line 27, claim 7, after "circuit" strike out the comma and insert instead "wherein an arc is maintained from"; line 37, claim 8, insert a comma after "circuit" and line 38, strike out the words "wherein the arc is maintained from"; and that the said Letters Patent should be read with these corrections therein that the same may conform to the record of the case in the Patent Office.

Signed and sealed this 2nd day of May, A. D. 1933.

M. J. Moore, (Seal)                                      Acting Commissioner of Patents.